Feb. 15, 1938.    R. R. CLARK    2,108,163
CENTRIFUGAL FEEDING DEVICE
Filed Jan. 29, 1935    3 Sheets-Sheet 1

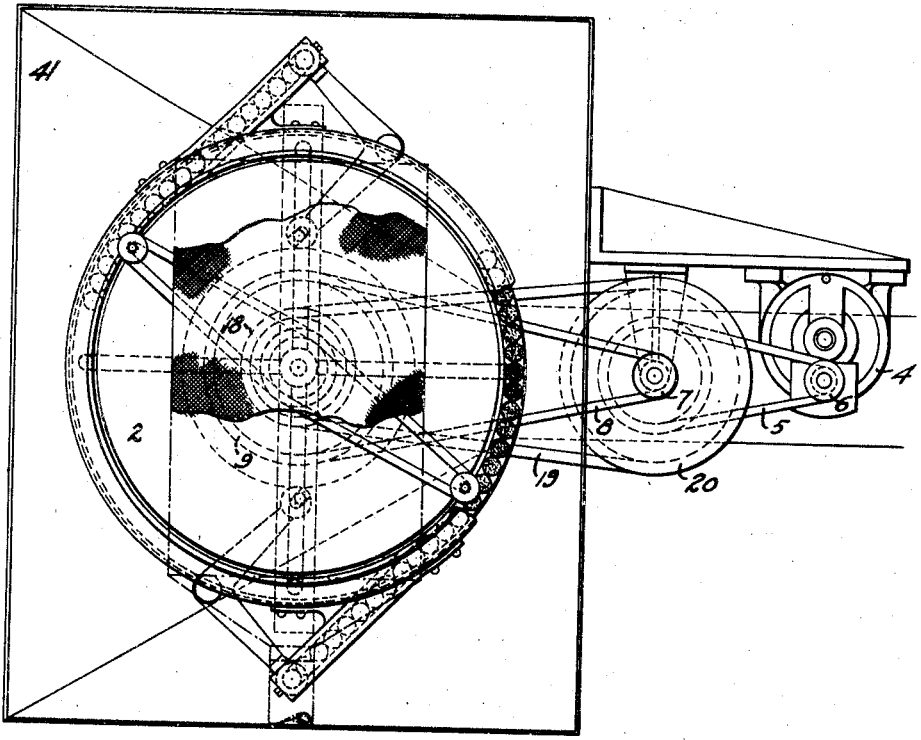
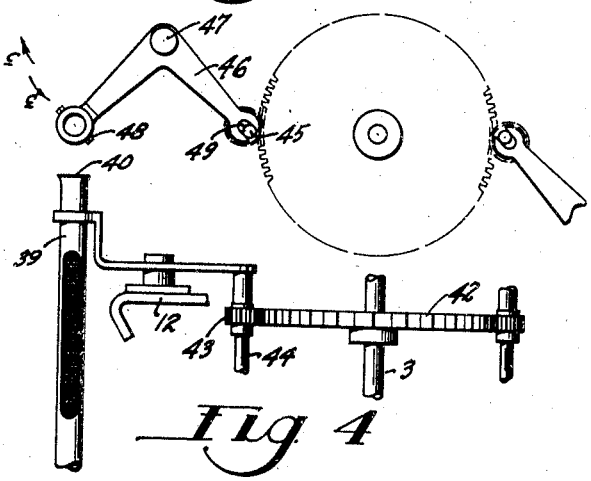

Feb. 15, 1938.   R. R. CLARK   2,108,163
CENTRIFUGAL FEEDING DEVICE
Filed Jan. 29, 1935   3 Sheets-Sheet 3
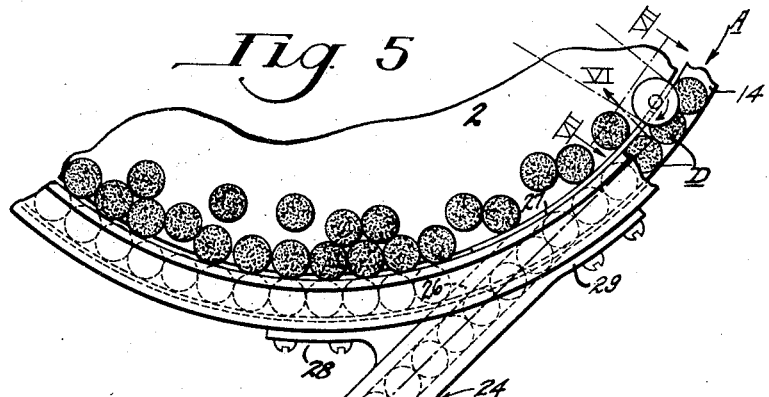
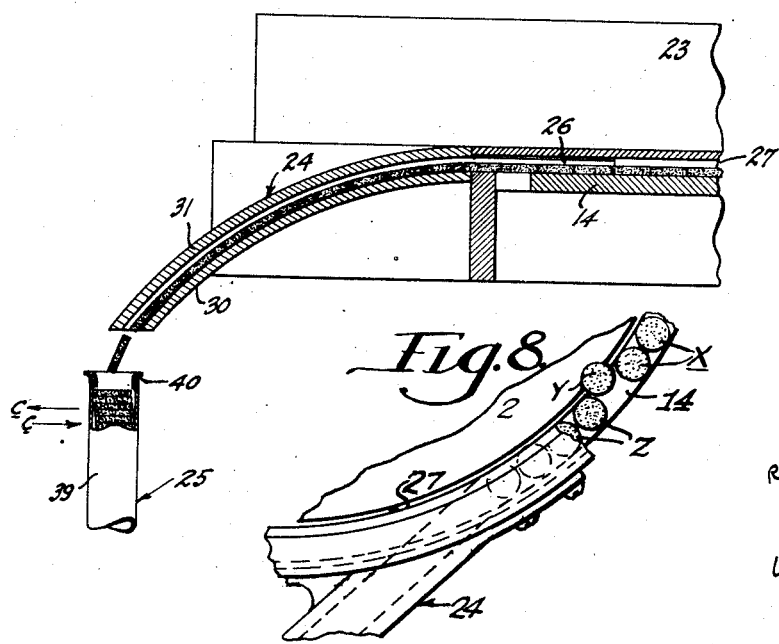

Patented Feb. 15, 1938

2,108,163

UNITED STATES PATENT OFFICE 2,108,163

CENTRIFUGAL FEEDING DEVICE

Ralph R. Clark, Lancaster, Pa., assignor to Armstrong Cork Company, Lancaster, Pa., a corporation of Pennsylvania Application January 29, 1935, Serial No. 3,993

11 Claims. (Cl. 221—136)

My invention relates generally to centrifugal feeding devices and is particularly adapted for feeding disks such for example as bottle closure liners or gaskets. A disk feeder will be illustrated and described as exemplifying a preferred embodiment of my invention.

It is an object of my invention to provide a centrifugal feeder which will feed successfully at a relatively high rate, but which may, nevertheless, be regulated to feed at a relatively low rate. According to my preferred embodiment, the rate of feed is controlled by means operable independently of the centrifuging member and may be in the form of a feeding ring coaxial with the centrifuging member and preferably in substantially the same plane. The centrifuging member may be driven at a constant speed sufficient to properly centrifuge the articles to be fed, and the speed of the conveying ring may be controlled so as to feed any desired number of articles per minute; the conveying ring generally operating at a relatively slower speed than the centrifuging member.

It is a further object of my invention to provide a device which will feed freely, whereby any tendency for the articles to become superimposed and consequently clogged is obviated. In my preferred embodiment this is accomplished by providing an oscillating stacker which is spaced a distance from a feed chute on the centrifuging and conveying mechanism sufficient to permit free and unrestricted fall of the articles being fed, whereby the articles will fall by gravity, regardless of whether the stacker is filled or not, thus preventing the building up of back pressure on the articles in the chute. If the stacker be filled, the articles may fall into a return receptacle.

My invention also contemplates a device for preventing the articles being operated upon from clogging at the entrance to the pressure feed section of the feed chute. In my preferred embodiment, the device is in the form of a rotating member provided adjacent the edge of a skimmer guide, which member serves to move any articles which may tend to become lodged at the entrance of the feed section back onto the conveying ring. It also serves to prevent disks on the ring from becoming so lodged by urging them inwardly should they tend to move toward the centrifuging device by reason of friction or obstacle.

My invention also provides means for preventing superimposed articles from entering the accumulating and conveying portion of the feeding device, which in the preferred embodiment of my invention takes the form of a stationary guard substantially coextensive with the working area of the accumulating and conveying ring.

According to the prior art structures, a single rotating plate has been employed and the speed thereof has been determined largely by the force necessary to centrifuge the articles, regardless of the speed of the machine to which the articles are to be subsequently fed. Accordingly, in most instances, the articles will not be removed from the centrifuging plate fast enough to prevent the machine from clogging due to the fact that the plate must generally rotate faster than necessary to feed a desired number of articles per minute in order to properly centrifuge the articles placed thereon. This is particularly true of articles possessing a relatively highly frictional surface, such as cork disks which require a relatively high speed centrifuging member. Many of the problems incident to the operation of a single rotating plate feeder are obviated by the use of a conveying ring, which ring may be driven at any desired speed required to feed a given number of articles per minute. In a feeder for cork disks embodying my invention, for example, the centrifuging member may revolve at about 200 R. P. M. and the conveying ring at 10 R. P. M. to feed 800 disks per minute.

In order that my invention may be more readily understood, I will describe the same in conjunction with the attached drawings in which, Figure 1 is a view, partly in elevation and partly in vertical section, illustrating my preferred device;

Figure 2 is a top plan view of my preferred device;

Figures 3 and 4 are detailed views of the stacker oscillating mechanism;

Figure 5 is an enlarged plan view, partly broken away, showing the chute and pressure feed guide as well as the rotating end for the skimmer guide;

Figure 6 is a sectional view taken along the line VI—VI of Figure 5;

Figure 7 is a sectional view taken along the line VII—VII of Figure 5; and

Figure 8 is a detail view showing how a "jam" may occur.

Figure 1:
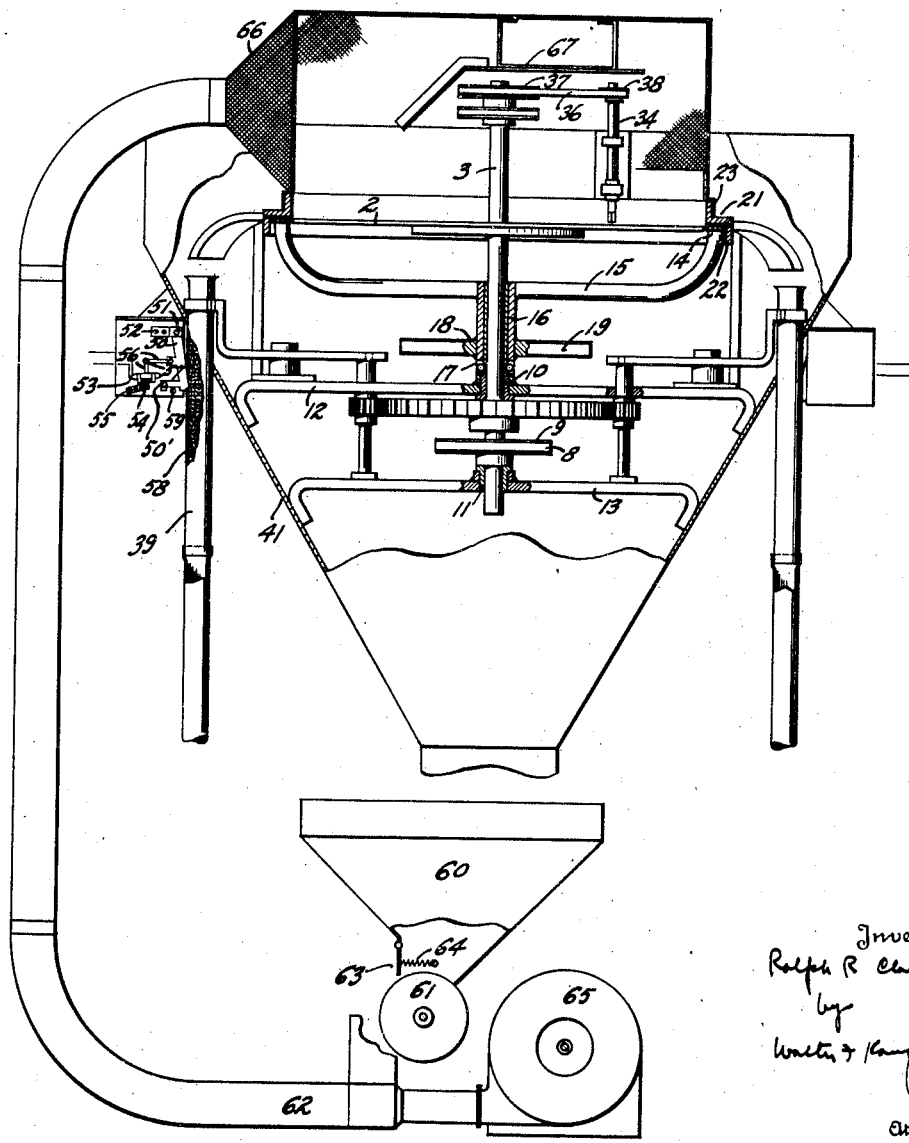

Referring first to Figures 1 and 2, my device comprises a centrifuging member 2 which is illustrated in the form of a round plate secured to a shaft 3. This plate preferably lies in a horizontal plane and is rotated by means of a motor 4 (Fig. 2) driving through a belt 5, pulleys 6 and 7, a belt 8 and a pulley 9 keyed to the shaft 3.

The shaft 3 is mounted in bearings 10 and 11 (Fig. 1) secured to supporting brackets 12 and 12 respectively. The plate 2 is rotated at a speed sufficient to centrifuge articles placed thereon to feed them to a conveying ring which carries the articles to a suitable reservoir, such as a stacker. The speed of the plate 2 will be dependent upon the weight of the articles to be centrifuged, the diameter of the plate and the relative coefficient of friction between the articles and the surface of the plate.

A conveying ring 14 is secured by means of a bracket 15 to a sleeve 16 rotatable on a thrust ball bearing 17 about the shaft 3. A pulley 18 is secured to the sleeve 16 and is driven by a belt 19 and a pulley 20 coincidentally with the pulley 7 (Fig. 2). The ring 14 is preferably driven in the same direction as the plate 2 and the speed may be controlled to suit the desired requirements. The pulley 20 may be stepped, if desired, to permit variation of the speed of the conveying ring 14, or the ring 14 may be driven from a separate motor through a variable speed reduction unit or other suitable speed regulating mechanism may be employed. If the required feed be known, the speed of the ring 14 need not be variable and, likewise, if desired, the feed may be in excess of the requirements and the excess returned to the source of supply.

In order that the articles be fed singly in series, the effective width of the ring 14 is substantially equivalent to the diameter of the disks being fed and, to prevent superimposed disks from being presented to the conveying ring, a guard plate 21 is provided which is preferably coextensive with the effective area of the conveying ring 14 as shown in Figure 1. The guard 21 is spaced from the ring 14 a distance slightly greater than the thickness of the disks being fed and in the event two disks should, at any time, be forced by the centrifuging device into engagement with the ring 14, the upper disk will be moved from the lower disk by engagement with the guard 21 and the lower disk will be centrifugally fed to the conveying ring 14. Thus, a continuous supply of disks will be fed to the ring 14 in single succession. Since the guard 21 is substantially coextensive with the effective working area of the ring 14, the problem of preventing clogging of the machine caused by presenting superimposed disks to the feed chute is obviated and the disks are fed in single succession. An edge guide 22 is provided as well as a guide 23; the guides shrouding the conveying ring 14. While this mechanism is particularly advantageous when employed in combination with the round plate and ring type centrifugal feeder of my invention it is also adaptable for use with single rotating plate feeders. It precludes the possibility of superimposed disks being presented to the feed section of the single disk type. In either the ring and plate type or the single rotating plate type feeders, the shrouded portion provides an extended accumulating surface upon which articles may be centrifugally positioned for subsequent feeding. This permits feeding at a relatively high rate since the disks may be positioned for feeding throughout substantially 360° of the conveying ring (which also acts as an accumulating ring), and the articles once so positioned may be subsequently fed from the ring. In other words, substantially the entire surface of the ring is effective for accumulating disks in feeding position (properly aligned and singly in series).

Referring now to Figures 5 and 6, a feed chute, generally indicated by the numeral 24, tangential to the ring 14 is adapted to convey disks D from the conveying ring 14 to an oscillating stacker 25, the operation of which will be more fully described. The chute 24 is provided with a finger 26 overlying the ring 14 as a secant and acting to strip the disks D from the ring 14 and enter them into the chute 24. The disks D are urged through the chute 24 by the pressure of the rearward disks on the ring. The ring 14 rotates in the direction of the arrow A carrying a continuous supply of disks to the pressure feed section and a guide or skimmer 27 serves to prevent the disks from moving radially, whereby pressure is applied to the disks D in the chute 24 by the oncoming disks on the ring 14.

The chute 24 is secured to the guard 22 by brackets 28 and 29. The chute may be made in any desired form, and in my preferred embodiment it is illustrated in arcuate form having a base plate 30, a cover 31, and side pieces 32 and 33. This chute may be so constructed that it is adjustable to convey various sizes and thicknesses of disks. It is desirable to have the disks fed freely in the chute and in some instances it may be found desirable to eliminate the cover plate 31. This is particularly desirable if wedge shaped disks are from time to time encountered, for these tend to become clogged in the chute by wedging under or upon the previous disk. It will be noted that the disks are permitted to fall unrestrictedly into the stacker 25, thus preventing the building up of back pressure on the disks in the chute 24.

In order to prevent clogging at the entrance to the pressure section of the feed chute, defined by the skimmer 27, a revolving end has been provided therefor (Figures 5 and 7). This device comprises a shaft 34 mounted in bearings 35. The shaft is provided with a squared end 34' which serves, upon rotation in the direction of the arrow (Fig. 5), to move any disk which may tend to work from the ring toward the centrifuging member back onto the ring.

In Figure 8 a "jam" is illustrated such as the revolving end serves to prevent. It will be noted that movement of disks Z leading toward the chute 24 has been impaired either by friction or obstacle and disk Y has worked outwardly from the ring 14 and is lodged against the skimmer 27 while the disks X on the ring are urged by rotation thereof into engagement with the disk Y and the disk Y is consequently urged into locking engagement with the skimmer 27; the ring 14 turning in the direction of the arrow. A similar jam might occur if the centrifuging device urged a disk into the position of the disk Y of Figure 8. Now, by providing a revolving end 34, as shown in Figures 5 and 7, the disk Y would be prevented from assuming the position shown in Figure 8 and the jam could not occur; all pressure developed by the ring 14 acting to move the disks through the chute 24; the pressure generally being sufficient to overcome any friction developed in the chute.

The revolving end may be rotated at a relatively high speed, say 1000 R. P. M., with very satisfactory results. Rotation may be imparted to the shaft 34 (Fig. 1) through the belt 36 from a pulley 37 secured to the shaft 3 and a pulley 38 secured to the shaft 34.

The disks may be fed from the chute 24 to any subsequent operation in any desired manner. In feeding liner disks to a closure assembly machine, I have found an oscillating stacker to be desirable. The stacker illustrated in Figures 4 and 6 comprises a tube 39 which is yieldingly supported a suitable distance from the mouth 40 thereof to permit oscillation. Oscillation is preferably effected in a direction parallel to the direction of travel of the disks, which are permitted to fall by gravity from the chute 24. They emerge as a substantially continuous stream from the chute and fall edgewise into the tube 39 and oscillation in the direction of the arrows C—C causes the disks to assume a horizontal position. When the disks are fed by gravity to an assembly machine through the tube 39, the feeder is preferably set at a speed slightly greater than that required to feed the assembly machine, to insure that the tube 39 will always be full. When the tube is completely filled, the disks which are in excess of the demands of the assembly machine fall onto the uppermost disk in the tube and are permitted to drop into an overflow hopper 41 (Fig. 1).

In my preferred device, two stackers are used, and, consequently, two feed chutes are employed, thereby feeding two assembly lines from one rotating centrifugal plate. The chutes and stackers are similar and only one will be described.

In Figures 3 and 4, a suitable oscillating mechanism for the stackers is shown and comprises a gear 42 keyed to the shaft 3 and a pinion gear 43 secured to a pinion shaft 44 suitably supported between the brackets 12 and 13. One end of the shaft 44 is provided with a crank pin 45 which operates against a bell crank 46 pivoted at 47 and secured to the stacker tube 39 by the split collar 48. The pin 45 operates in a slot 49 provided in the bell crank 46, rocking it about the pivot 47 and imparting oscillating motion to the stacker tube 39 in the direction C—C. The oscillating mechanism, being associated with the main shaft 3 of the disk 2 through the gears 42 and 43 and the shaft 44, is in continuous operation so long as the plate 2 is rotating.

The feed chute 24 is arced as shown in Figure 6 and the disks are fed in a substantially continuous stream therefrom, falling into the tube 39 in an inclined position; the direction of incline being substantially parallel to the direction of flow. Oscillation of the tube 39 in a direction substantialy parallel to the direction of incline or feed causes the disks to gradually assume a horizontal position in the vertically extending stacker. The stacker may be oscillated at 1000 oscillations per minute and one-eighth inch travel with good results.

As pointed out above the rate of feed of the ring 14 should preferably be set a little ahead of the feed of the machine to which the disks pass from the stacker. In the event the centrifugal feeder fails to operate and the disks in the stacker fall below a predetermined amount, it has been found desirable to provide means for signalling the machine operator, stopping the machine to which the disks are fed from the stacker or otherwise control the flow of disks from the stacker. With a free fall in the tube greater than approximately 10" from the mouth 40 of the tube 39, it has been found difficult to cause the disks dropping therein to immediately assume a horizontal position.

In Figure 1 a suitable electrically operated control switch is shown which comprises a weighted arm 50 pivoted at 51 to a supporting bracket 52. A mercuroid switch 53 is pivoted at 54 to a support 55, and is connected to the weighted arm 50 by the links 56 which are connected and pivoted at 57. The arm 50 is so weighted at 50' that it tends to enter the stacker tube 39 through a slot therein. When the level of the disks 58 in the tube 39 recedes to a position below the arm 50, the arm 50 enters the tube 39 causing the links 56 to move the switch 53 about its pivot 54 thus breaking contact in the usual manner in switches of this type. The switch 53 may be operative to control a signal; to control the operation of the machine to which the disks are fed from the tube 39 or to prevent disks from being fed from the tube. A stop pin 59 may be provided to limit movement of the arm 50. As the tube again fills, it urges the arm to the position shown in Figure 1 and the switch is again brought into contact rendering the signal or control inoperative.

In order to insure that a substantially uniform quantity of disks be supplied to the centrifuging member, a controlled feeding device is provided. A suitable feeder is illustrated in Figure 1 and comprises a supply hopper 60 adapted to hold a quantity of disks or other articles to be fed. The hopper tapers to the bottom and is provided with a feed roll 61 which is driven by suitable means not shown. This feed roll 61 extends transversely of the bottom of the hopper 60 and is adapted to carry disks from the hopper 60 to a conveying tube 62. A hinged guard plate 63 may be provided to limit the disks fed from the hopper to a single thickness so that the rate of feed may be accurately controlled. This plate may be held in position by a spring 64 so that it will be free to move slightly to prevent clogging. A blower 65 is provided to move disks fed to the tube 62 through the tube and onto the centrifuging plate 2. A wire guard 66 may be provided transversely of the plate 2 to prevent scattering of the disks and a guard 67 may be provided to prevent disks from becoming entangled in the belts and pulleys.

The return hopper 41 preferably extends above the plane of the plate 2 and any disks which may be blown from the plate 2 will fall into the hopper 41 which is advantageously provided with an outlet returning to the feed hopper 60.

The rate of feed of disks to the centrifuging member is preferably slightly greater than that required to feed the machine from the stacker tubes associated therewith, thus the centrifuging plate 2 will always supply substantially the same number of disks to the feed ring 14 as required to be fed by the feed ring to the stackers. From this it will be apparent, that the speed of the centrifuging plate 2 may be sufficiently high to properly feed the disks to the conveying ring 14 regardless of its speed. If the speed of the conveying ring be increased (to increase the rate of feed thereof) it is not necessary to change the speed of the centrifuging member, but only to increase the rate of feed of disks thereto.

While I have described and illustrated the preferred embodiment of my invention, it will be understood that the invention is not so limited but may be otherwise embodied within the scope of the following claims.

I claim:

1. A centrifugal feeder for closure liner disks or the like comprising an accumulating and conveying member adapted to receive and convey a single series of disks disposed thereon and freely movable therewith, a centrifuging member coaxial with said accumulating and conveying member adapted to move disks fed heterogeneously thereto onto the member, and means for rotating said conveying member and centrifuging member at different speeds.

2. A centrifugal feeder according to claim 1 in which the conveying member and centrifuging member are coaxial and are disposed in a horizontal plane.

3. A centrifugal feeder for closure liner disks or the like comprising an accumulating and conveying member adapted to receive and convey a single series of disks disposed thereon and freely movable therewith, a centrifuging member coaxial with said accumulating and conveying ring adapted to move disks fed heterogeneously thereto onto the conveying member, a chute associated with the conveying member, a guide overlying the conveying member and adapted to strip articles therefrom and enter them into the chute, and means for imparting a rotary motion to the centrifuging member and a slower rotary motion to the conveying member.

4. A centrifugal feeder for closure liner disks or the like comprising an accumulating and conveying ring adapted to receive and convey a single series of disks disposed thereon and freely movable therewith, means disposed at the conveying ring for preventing superimposed articles from being disposed thereon, a centrifuging member adapted to move disks fed heterogeneously thereto onto the ring, said conveying ring being coaxial with the centrifuging member and positioned adjacent the periphery thereof, and means for rotating the centrifuging member at a speed sufficient to move articles placed thereon radially onto the conveying ring and for rotating the conveying ring at a speed to convey disks at a predetermined rate.

5. A centrifugal feeding device comprising a centrifuging member and a feed ring, means for rotating the centrifuging member at a speed sufficient to move articles placed thereon radially onto the conveying ring, means for rotating the feed ring at a predetermined speed to feed a predetermined number of articles per minute, and means for supplying the articles to the centrifuging member at a rate substantially the same as the rate of feed of the conveying ring.

6. A centrifugal feeding device comprising a centrifuging disk, an accumulating and conveying ring coaxial with said disk and lying in substantially the same plane, a feed chute associated with the ring, said chute including a stripping finger, a skimmer guide adapted to prevent radial movement of articles on the ring, means for rotating the disk to centrifuge articles placed thereon and place them on the ring and means for rotating the ring to move the articles to the stripping finger, the portion of the chute defined by the skimmer constituting a pressure feed section whereby articles in the chute are urged therethrough by the pressure developed by the articles on the ring being fed into the pressure feed section.

7. A centrifugal feeding device comprising a rotatable centrifuging disk, a rotatable accumulating and conveying ring coaxial with said disk, a stationary guard defining an accumulating portion, a feed chute, a guide overlying the ring and adapted to strip articles from the ring and enter them in the chute, a skimmer guard extending substantially parallel to said ring in the direction of rotation thereof to a position adjacent the guide and adapted to prevent radial movement of articles on said ring and a rotatable end for said skimmer guard.

8. In a feeding device, the combination of a rotatable centrifuging member, an accumulating and conveying ring coaxial with said member and adapted to receive a single series of articles disposed thereon, a vertically extending stacker tube, a feed chute adapted to convey articles from said accumulating and conveying ring to said stacker tube and enter them on edge therein, and means for oscillating said tube in a plane substantially including the direction of feed of said articles from said chute to cause said articles to assume a horizontal position therein.

9. In a feeding device, the combination of means for centrifuging and conveying articles to a feed chute, a skimmer guard adapted to prevent radial movement of articles on said conveying means, a shaft mounted adjacent the leading edge of the skimmer guard and lying substantially parallel to the edge thereof, means on the shaft adapted to urge articles coming into contact therewith away from the guard and means for rotating the shaft.

10. In a centrifugal feeder having a pressure feed section defined by a skimmer guide, the combination of a rotating end for the guide comprising a shaft mounted adjacent the leading edge of the guide and extending substantially parallel to the exposed edge thereof, the shaft being provided adjacent its lower edge with means adapted to engage articles moving toward the skimmer guide and deflect the movement thereof.

11. A centrifugal feeder for closure liner disks or the like comprising a centrifuging member, a chute and a skimmer guide defining a pressure feed section associated with the chute, said skimmer guide including a rotatable member at the leading end thereof serving to prevent clogging at the entrance to the pressure feed section defined by said skimmer guide.

RALPH R. CLARK.